United States Patent Office 3,532,295
Patented Oct. 6, 1970

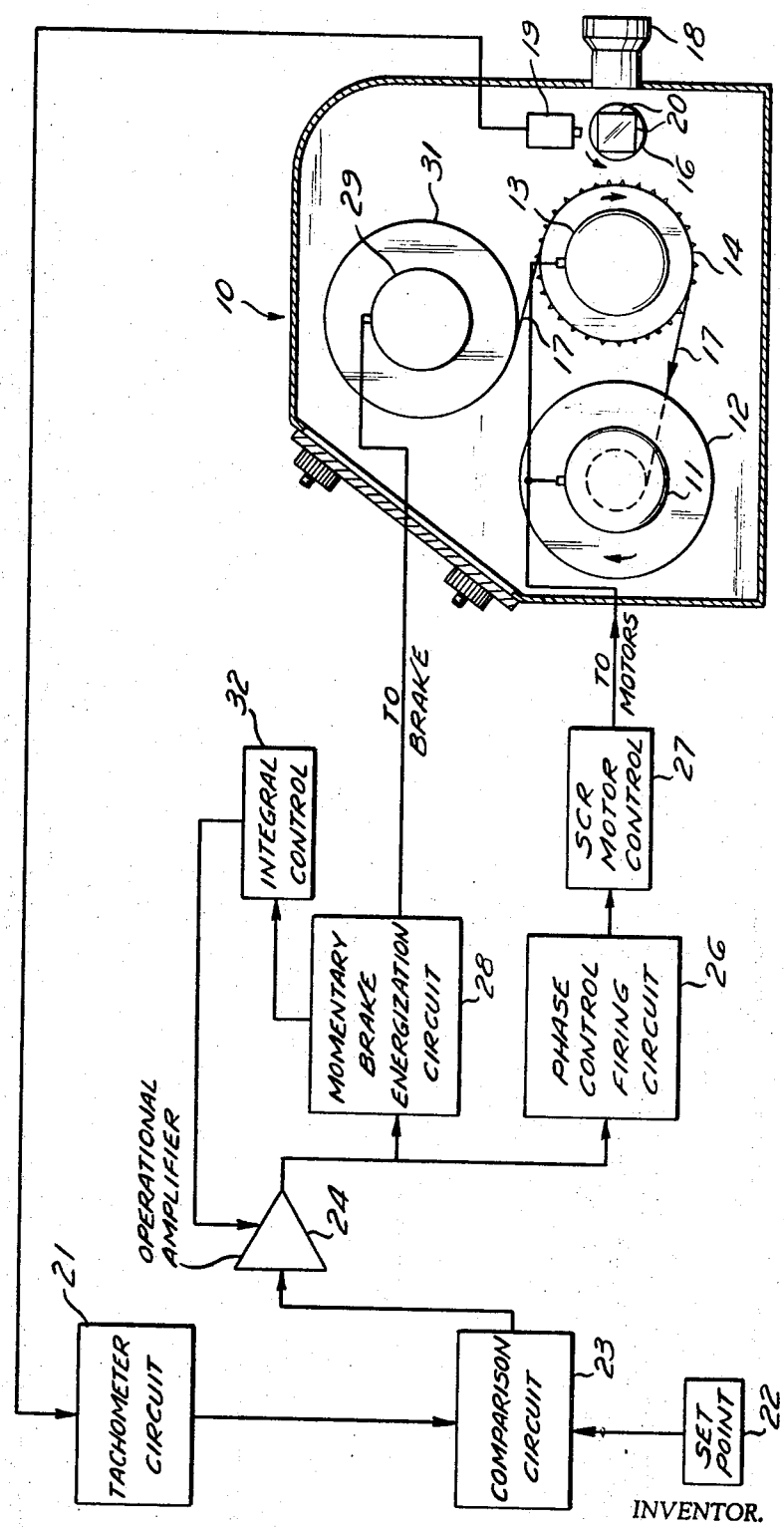

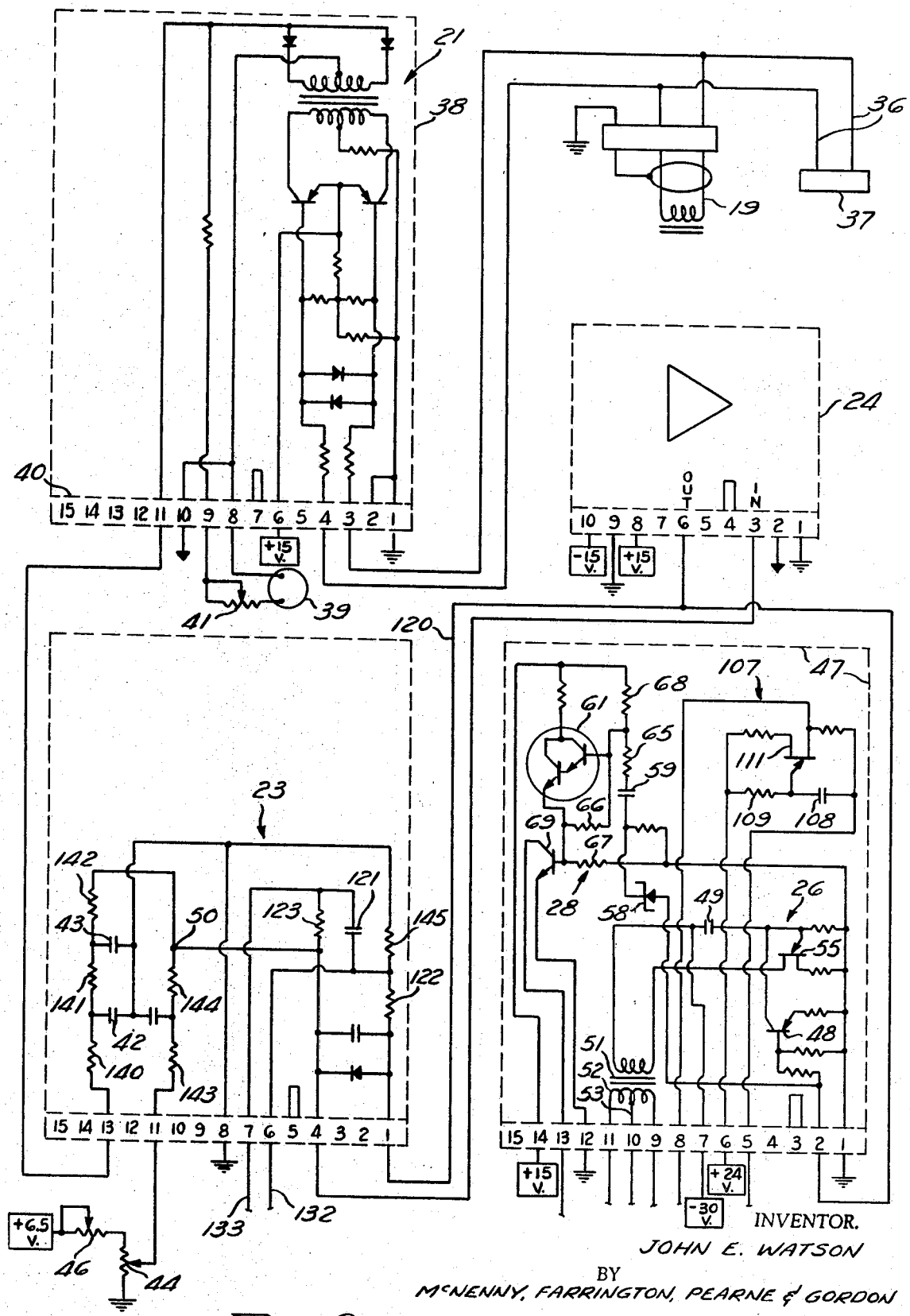

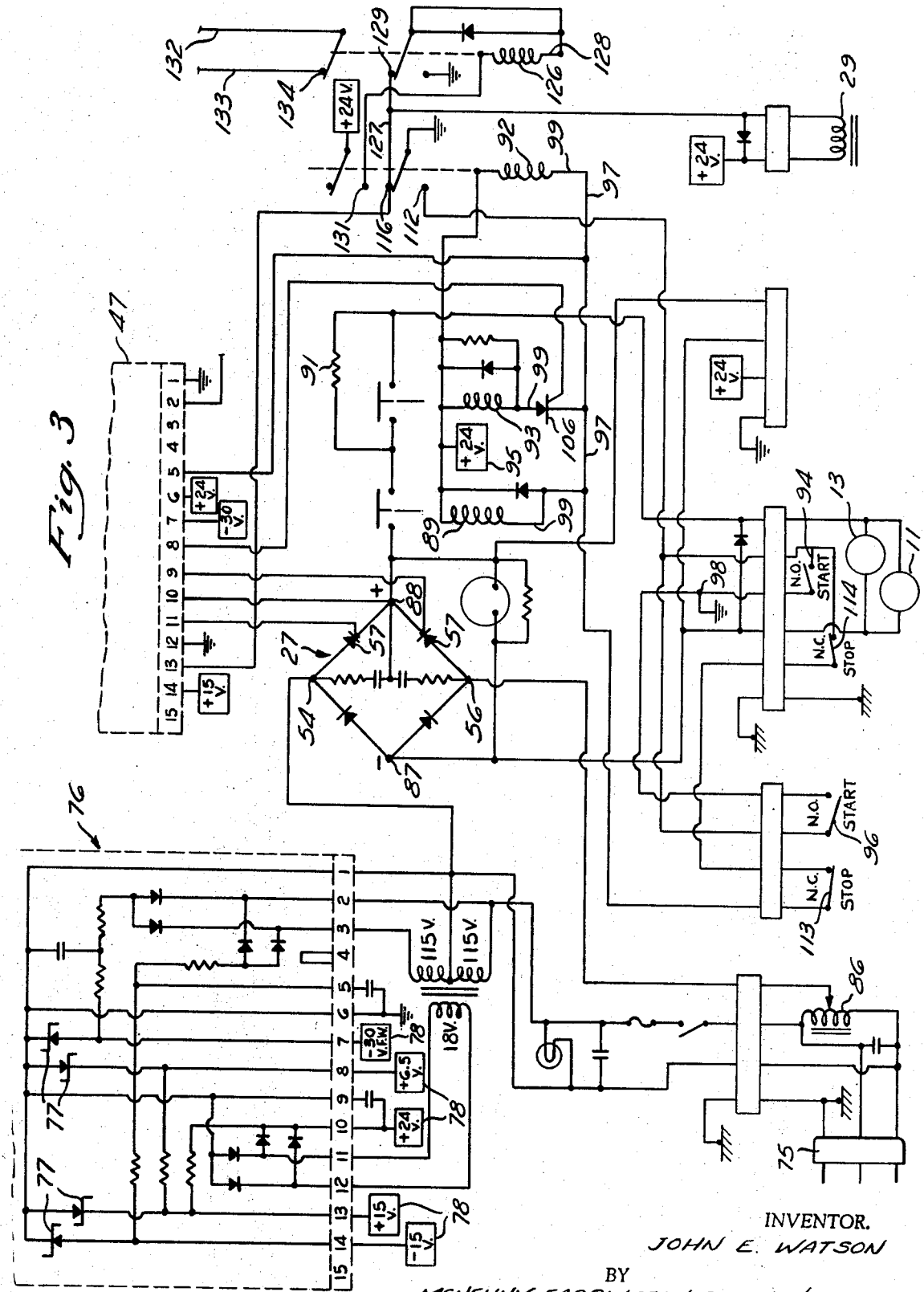

3,532,295
HIGH SPEED CAMERA SPEED CONTROL
John E. Watson, 23456 Hilliard Blvd.,
Westlake, Ohio 44145
Filed Mar. 6, 1969, Ser. No. 804,902
Int. Cl. B11b *15/32;* G03b *1/04*
U.S. Cl. 242—205                    17 Claims

ABSTRACT OF THE DISCLOSURE

An automatic servo control for a high speed camera providing precise film speed regulation and including a circuit to prevent overrunning of the supply reel and film during the transition between acceleration from start-up and operation at constant speed to eliminate the risk of film damage or destruction. Control circuitry operable to both momentarily energize a brake on the supply reel to prevent such overrunning and introduce integral control.

BACKGROUND OF THE INVENTION

High speed motion picture cameras, typically, are used in engineering studies to record the motions of a subject which are too fast to be seen by an unaided observer or recorded by a conventional motion picture camera. High speed is achieved by exposing a continuously moving strip of film. One type of camera system uses a synchronized rotating prism assembly to move an image of the subject in unison with each frame of film. Such movement of the image with the film avoids the speed limitations associated with more conventional cameras, which stop the film each time a frame is exposed. Another type of high speed camera uses stroboscopic flashes of such short duration that there is no appreciable film movement during each flash.

After the event has been filmed, the sequence of motions may be studied by projecting the film at a rate low enough to be followed by an observer. Additionally, individual frames taken at time intervals throughout the recorded event may be compared separately. Precise control of film speed provides accurate recording of motion with respect to time; if speed is accurate, the time elasped between any positions of the subject may be calculated by counting the number of frames between such positions. Accurate recording also requires that sufficient pictures be taken of the event. Camera speed ranges between several pictures per second to several thousand pictures per second permit the filming of events which occur within seconds or milliseconds. In many cases, the film exposed during acceleration to optimum speed may be wasted, since the picture rate is too slow or difficult to determine.

PRIOR ART

In the past, most cameras used for high speed photography have offered no direct control of film speed. Commonly, cameras have been driven by AC–DC series wound motors. Maximum speed has been determined by simply fixing the input voltage to such motors. A constant voltage input arrangeemnt is usually characterized by a relatively slow response or acceleration of the film to its desired optimum speed. The acceleration rate, in these arrangements, is necessarily limited, since motor torque is governed by this fixed voltage. Moreover, since voltage is fixed, variations in film speed will occur when driving loads change. Commonly, after the film has accelerated to its optimum speed, inertial loads are developed when the film supply reel speeds up to compenstte for a decrease in the diameter of the film on this reel near the end of the film run. This increasing inertial load normally results in an undesirable decrease in film speed.

SUMMARY OF THE INVENTION

It is the principal object of this invention to achieve precise control of film speed by providing a control device whereby fluctuations in film speed are eliminated to thereby substantially improve recording accuracy. The precise speed control is achieved by the control device by comparison of a control signal proportional to film speed with a reference signal level associated with the desired or optimum film speed.

Input power to the motor drive is regulated to minimize the difference between the speed control signal and reference signal under all conditions and variations of load. Since power is no longer necessarily limited to that required to reach the desired film speed, a predetermined percentage of additional power in one embodiment is available to maintain such speed when running loads change or inertial loads develop at the end of a film roll.

It is an additional principal object of the invention to provide a new important brake control for the film. This brake control is compatible with precise speed control and provides maximum film acceleration from a start-up to minimize film loss because less film is exposed during the acceleration stage.

High film acceleration must be achieved in order that proper exposure is obtained as soon as possible with the proper exposure than maintained during continued movement of the film. During acceleration, accurate recording is difficult, since the exposure rate is constantly changing and, at least initially, may be too slow. In accordance with the present invention, maximum acceleration is achieved because motor input voltage during acceleration is not limited by the voltage required to reach optimum speed. By the use of the brake control of the control device, the full power of the circuit may be applied to the drive mechanism of the camera during the acceleration stage of the film. The brake control in accordance with the present invention prevents overrun of the supply reel of the film at the transition point between acceleration and operation at constant speed to prevent possible film destruction.

It is a further object of this invention to reduce film breakage by providing two control drive motors. One of the control drive motors drives the take-up reel and the other control drive motor drives the film drive sprocket. It will be understood that these two motor drives reduce the level of film tension during the operation of the camera and thereby considerably reduce the percentage of film breakage due to excess and/or excessively high film tension during operation of the camera.

An additional object of this invention according to the above-mentioned embodiments is the provision of a control circuit which includes integral control to minimize the amount of possible error between the desired speed and the actual running speed. Moreover, this invention provides a novel arrangement whereby such integral control is introduced only when the system closely approaches the desired speed from start-up to further augment precise speed control.

This summary of the invention rather characterizes the camera apparatus and the important summaries will be described and understood with reference to the following description and drawings. Further embodiments of the invention are hereby fully set forth.

BRIEF DESCRIPTION OF THE DRAWINGS

FIG. 1 is a block diagram showing, in simplified form, the control system which embodies this invention;

FIG. 2 shows a portion of the electrical circuit, arranged on circuit cards, corresponding to the left-hand and central control blocks of FIG. 1; and FIG. 3 shows that portion of the electrical circuit corresponding to the right-hand control blocks of FIG. 1 and, in addition, the power supply circuit card, motor connections, and various control relays.

DESCRIPTION OF THE PREFERRED EMBODIMENTS

In its preferred arrangement, this invention provides a camera with two driving motors. FIG. 1 shows the camera 10 in schematic form. One motor 11 is connected to drive the take-up spool 12 and another motor 13 is provided to drive the film sprocket 14. A prism assembly 16 is geared directly to the film drive sprocket 14 and is thus driven in synchronization with the transport speed of the film 17. The lens 18 focuses an image through the prism 16 onto the film 17 as it is carried by the drive sprocket 14. The prism 16 moves the image along with the film 17 to permit the film to be exposed without stopping it.

Film speed is measured by determining the rotational speed of the prism assembly 16 by means of a magnetic pick-up or transducer 19 which is arranged in close proximity to a steel shaft (not shown) on which the prism 16 is mounted. A number of holes in this shaft, which correspond to the number of prism faces 20 (in this case four) are magnetically sensed by the pick-up or transducer 19. As the prism 16 rotates with the film drive sprocket 14, voltage pulses are generated by the transducer 19 as these holes in the prism shaft pass under it. These voltage pulses are conducted to a tachometer circuit 21 which provides a voltage analog signal proportional to the pulse rate emitted from the magnetic transducer 19. From this it should be understood that the tachometer circuit 21 supplies a voltage proportional to the transport speed of the film 17.

A source 22 for a set point voltage or a command signal is provided for comparison with the signal generated by the tachometer circuit 21. The set point voltage or command signal represents that voltage which the tachometer circuit would generate when the film 17 is driven at a desired speed. A comparison circuit 23 determines the voltage difference between the set point signal and the tachometer signal. This voltage difference is provided as an input for an operational amplifier 24. The voltage output of the operational amplifier 24, until saturation of the amplifier, is proportional to the difference in such signals. Immediately when the camera is started, the operational amplifier 24 is saturated, since there is a relatively large voltage difference between the set point signal and the tachometer signal. This difference is, namely, the value of the set point signal, since the film speed is zero and the tachometer circuit is therefore providing no signal. The large voltage output of the operational amplifier 24 indicates that full power should be applied to the motors 11 and 13 of the camera 10. Accordingly, this is accomplished through the phase control firing circuit 26 connected to the amplifier 24 and, in turn, the SCR motor control circuit 27.

As the filmstrip increases from start-up, the tachometer analog voltage approaches the set point voltage and the voltage output of the operational amplifier rapidly approaches zero. The resulting low level amplifier voltage indicates that the actual film speed has approaches the desired value. By means of the phase control firing circuit 26 and SCR motor control 27, input power to the camera motors 11 and 13 is reduced from that used for acceleration to a value which will maintain them at the desired speed.

At the same time, when the film speed is approaching the point of transition from acceleration to constant speed, a brake energization circuit 28, also connected to the output of the amplifier 24, momentarily energizes a brake 29 connected to the film supply reel 31. This prevents the supply reel 31 and film 17 from overrunning the speed of the drive sprocket 14 during a rapid change in acceleration rate. Additionally, an integral control circuit 32 is activated by the response of the momentary brake circuit 28. The integral control circuit 32 provides very precise film speed control by minimizing the difference or error between the tachometer voltage and set point voltage. Moreover, the arrangement provided by this invention allows the integral control circuit 32 to be effective only when the film speed has approached the desired speed, to thereby eliminate speed overshoot.

Reference to FIGS. 2 and 3 is now made for a more detailed description of the circuitry. At the outset, it should be noted that various subcircuits are arranged on circuit cards which are provided with terminals numbered 1 and 15. These terminals are arranged in horizontal rows at the lower portion of each mounting card and should not be confused with the reference numerals identifying the various components. Similarly, the operational amplifier 24 is provided with terminals 1 through 10. As seen, not all of the terminals on each mounting card or those of the operational amplifier are utilized.

The magnetic pulse transducer 19 is shown in the upper right-hand portion of FIG. 2. As mentioned above with reference to FIG. 1, this transducer 19 senses rotation of the prism assembly 16. The holes in the steel shaft (not shown) supporting the prism assembly 16 are angularly related to the angular positions of the individual prism faces 20. This allows an electronic flash or strobe light to be timed with the exposure of each film frame. For this purpose, two leads 36 and a connector 37 are provided for such external equipment. In other types of cameras where the prism shaft provides no holes or where there is no prism shaft such as in a stroboscopic camera, any convenient magnetic member moving with a fixed relationship to film movement may be sensed with the transducer 19. Such would include gear teeth or fastening screws on a rotating part. Of course, one of several other means, such as a tachometer generator or a photocell pick-up, could be used to derive an analog film speed voltage.

The voltage pulses generated by the transducer 19 are conducted to the tachometer circuit 21. The electrical components of the tachometer circuit 21 are physically secured to a mounting card 38, shown in phantom. The mounting card 38 is provided on its lower side 40 with a set of connecting terminals 1 through 15, which are adapted to be inserted into a mating connector (not shown). The tachometer circuit 21 is powered with a positive 15-volt source connected at terminal 6 on the mounting card 38. This positive 15-volt source and similar voltage sources to be discussed are provided by power supply described below.

A visual indication of actual film speed is provided by a speed meter 39 connected to the output of the tachometer circuit 21 at terminals 9 and 8 of the associated mounting card 38. A trimmer potentiometer 41 is provided for an initial calibration of the speed meter. The speed meter may be provided to read directly in units of frames per second.

The voltage output of the tachometer circuit 21 is conducted from a terminal 11 of the associated card 38 to the comparison circuit 23 by means of a terminal 13 of a mounting card associated with the comparison circuit 23. Capacitors 42 and 43 are provided to filter the voltage signal from the tachometer circuit. A set point voltage or command signal is provided by a potentiometer 44. The adjusting dial of this potentiometer 44 may be calibrated directly in pictures per second. A nominal voltage of +6.5 volts is initially adjusted by a trimmer potentiometer 46 to match a particular control circuit. The set point potentiometer 44 thus operates on this adjusted or circuit-matched voltage.

The comparison circuit 23 comprises a mixing point 50 at which the tachometer voltage signal and set point voltage are mixed. Since the voltage generated by the tachometer circuit 21 is at a negative potential and the set point voltage is positive, the signals are in effect subtracted at the mixing point 50. The resultant voltage is conducted from the comparison circuit 23 through terminal 4 of the mounting card associated with the comparison circuit to the operational amplifier 24 at its input terminal 3. The operational amplifier, shown schematically in FIG. 2, may be a commercially available solid state unit, such as that manufactured by Philbrick/ Nexus Reserch, Allied Drive at Route 128, Debham, Mass. 02026 (Model P 65A). The operational amplifier 24 is powered by positive and negative 15-volt sources applied at input terminals 8 and 10, respectively. The output of the operational amplifier 24, at terminal 6, is supplied to the phase control firing circuit 26 and momentary brake energization circuit 28 arranged on a common mounting card 47. The output voltage on the operational amplifier 24 from terminal 6 is connected to the input terminal 2 of the mounting card 47. The phase control firing circuit 26 is arranged on the lower half of the mounting card 47, while the momentary brake energization circuit 28 is mounted on the upper left-hand portion of the mounting card.

Referring now to the phase control firing circuit 26, the amplifier voltage supplied to terminal 2 of the associated mounting card 47 regulates the current passing through a transistor 48, which in turn regulates the charging rate of a capacitor 49. A charging voltage of −30 volts full wave is applied through terminal 7 of the mounting card 47. When the capacitor 49 is sufficiently charged, a unijunction transistor 55 becomes forward-biased to permit the capacitor 49 to discharge through the peaking transformer 51. The leads from the secondary coil 52 of the transformer 51 are connected through the terminals 9, 10, and 11 of the mounting card 47 to the silicon controlled rectifier bridge circuit 27, which supplies power to the camera motors 11 and 13, as shown in FIG. 3.

The silicon controlled rectifier bridge circuit 27 is capable of supplying rectified voltage to the motors 11 and 13 during both half-cycles of an AC source connected at points 54 and 56 of the bridge circuit 27. The firing angle or that portion of each half-cycle which one of the SCRs 57 conducts depends on the time at which the unijunction transistor 55 becomes conductive to generate a trigger pulse through the transformer 51.

From the above description, it may be understood that the firing angle or that portion of a half-cycle that one of the SCRs 57 is in conduction depends on the voltage difference between the tachometer signal and set point signal. If the difference between such signals is large, as when the camera is started, the SCRs 57 will be fired early in each half-cycle in order that the full power available will be applied to the camera motors 11 and 13. This is accomplished by the phase control firing circuit 26, wherein the transistor 48 regulated by the amplifier voltage allows the capacitor 49 to be charged early in each half-cycle. On the other hand, when the film speed has approached a desired set speed, the difference between the tachometer voltage and the set point voltage becomes small, and the output voltage of the amplifier conducted to the charging transistor 48 is similarly small. Under these circumstances, the charging current through the transistor 48 is reduced to thereby delay the trigger pulse through the transformer 51 to a point somewhat later in each half-cycle. The arrangement wherein the power supplied by the SCR bridge circuit is proportional to the error between the actual film speed and the desired set speed is referred to as proportional control. During operation at constant speed, the power supplied through the SCRs 57 will match the power requirements of the motors 11 and 13 to maintain the desired film speed.

MOMENTARY BRAKE ENERGIZATION

It has been found that under high acceleration rates, in particular with rates obtainable with two driving motors, the supply reel 31 and film 17 have a tendency to overrun the film drive sprocket 14 during the transition from acceleration to operation at the desired constant speed. This overrunning of the supply reel 31 and film 17, if unchecked, may result in destruction of the film 17, since it may not properly engage the film drive sprocket 14 and, as a result, may jam at some point along its path. The phenomena of overrunning is apparently a result of the release of energy stored in the film when it is under relatively high tension during acceleration. To overcome this problem, a novel control circuit is provided according to this invention to momentarily energize the brake 29 on the supply reel 31 during the period of transition between acceleration and constant speed.

To minimize film waste, it is desirable to operate a camera at a high acceleration rate. The rate of acceleration is limited by the tensile strength of the film and it is therefore undesirable to introduce any unnecessary drag on the film. While it may be possible to overcome any overrunning of the supply reel 31 during the transition from acceleration by providing a constant drag brake, such a provision would have the effect of limiting the potential acceleration rate, since it would add directly to film tension. Accordingly, this invention provides a means to momentarily apply a braking load to the supply reel only during the transition between acceleration and operation at constant speed. Thus, the braking load is added at a time after film tension due to acceleration is reduced from its maximum level.

Referring back to FIG. 1, it can be seen that the input of the momentary brake energization circuit 28 is connected to the output of the operational amplifier 24. The electrical components and circuitry are shown on the upper left-hand corner of the mounting card 47 represented in the lower right-hand area of FIG. 2. Typically, upon start-up, the operational amplifier 24 will be saturated at its output voltage of approximately −13 volts. A Zener diode 58 is connected to receive the output of the operational amplifier 24 through the terminal 2 on the associated mounting card 47. The Zener diode 58 is adapted to drop approximately 9 volts of the −13 volts supplied by the operational amplifier. The remaining −4 volts charges the condenser 59.

When the film speed approaches the desired speed, the output voltage of the operational amplifier 24 rapidly changes from its saturation voltage of −13 volts. When the amplifier voltage becomes less than −9 volts, the Zener diode 58 no longer conducts current. At this point, the condenser 59 discharges through resistors 65, 66, and 67, and the base of a Darlington pair transistor 61, turning on this transistor. The emitter current of the Darlington pair transistor 61 flows through the base of a second transistor 69, turning it on. This second transistor 69 controls the operation of the brake during its momentary energization. The coil of the brake 29 is schematically shown in the lower right-hand portion of FIG. 3. A positive 24-volt source is connected to one side of the brake coil 29. It may be seen that the other side of the brake coil will be grounded through the transistor 69 having its collector connected to the brake through terminal 13 and its emitter connected to ground through terminal 12 of the associated mounting card 47. The braking action decreases exponentially as the condenser 59 discharges. Rapid excursions of the amplifier output voltage more negative than −9 volts will not appreciably recharge the condenser 59, since the charge rate is limited by the resistors 65, 66, and 67. Thus, the brake 29 will not be re-energized after the camera has once reached the desired set speed, thereby preventing an oscillatory camera speed condition.

Referring now to FIG. 3, the control system is adapted to be operated from a 115-volt AC source to which an electrical plug 75 may be connected. A power supply circuit 76 is provided to supply the various voltages and polarities used in the control circuit. Various supply voltages are provided at terminals 7, 8, 10, 13, and 14 of the mounting card associated with the power supply 76. These various voltages are regulated by associated Zener diodes 77. For the sake of simplicity, the connections between these voltage sources 78 and various subcircuits have not been shown. Thus, rectangular blocks corresponding to the voltage sources 78 have been shown in the figures. It should be noted that all of these voltage sources 78 are filtered DC except the −30 v. source at terminal 7 which is simply a 115 v. RMS sine wave full wave rectified and clipped at 30 volts.

A Variac 86 may be connected to the incoming 115-volt AC supply source to regulate the voltage applied across the silicon controlled rectifier bridge circuit 27. The output voltage of the Variac may be regulated from zero to approximately 150 volts AC. As shown in FIG. 3, the drive sprocket motor 13 and the take-up reel motor 11 are connected in parallel. One side of each of these AC–DC series wound motors 11 and 13 are connected directly to the negative side 87 of the SCR bridge circuit. The other sides of these motors 11 and 13 are connected to the positive side 88 of the SCR circuit 27 when a relay 89 is energized.

CAMERA START-UP

Operation of this relay 89 permits current to flow through the power resistor 91 into the positive side of the motors 13 and 11. This power resistor 91 is provided to reduce the initial voltage to the camera motors 11 and 13 momentarily for a "soft start." That is, to prevent film breakage, due to excessive motor starting torque, the voltage applied at start-up is somewhat reduced from that passed by the SCRs 57 of the bridge circuit 27. After a short time delay, another relay 93 is energized to short-out the power resistor 91.

The upper sides of these relays 89 and 93 and an additional relay 92 are commonly connected to a +24 volt DC source 95, ultimately from the power supply 76 as described above. The camera 10 is started by pressing either a start switch 94 associated with the control package or a remote start switch 96 connected in parallel to the start switch 94. As may be seen from FIG. 3, the closing of either of these switches 94 or 96 has the effect of grounding a line 97, at a point 98, to which the lower sides 99 of the relays 89, 93 and 92 are connected. As either switch 94 or 96 is closed, relays 89 and 92 are immediately energized. As mentioned above, energization of the relay 89 causes current to flow through the power resistor 91 into the motors 13 and 11. Immediate energization of the relay 93 is prevented by an SCR 106 connected at the lower side 99 of the relay 93. Energization of this relay 93 shorts the power resistor 91 and directs the full power being supplied by the SCR bridge circuit 27 to the motors 11 and 13.

A time delay action regulating the SCR 106 is provided by a time delay circuit 107 shown in FIG. 2. When a start switch 94 or 96 is closed, one side of a capacitor 108 is grounded through contact 5 of the associated mounting card 47. The capacitor 108 is charged by a positive 24-volt DC source through terminals 6 of the mounting card 47 through a resistor 109. The capacitor 108 charges through the resistor 109 until the emitter of the unijunction transistor 111 becomes forward-biased. At this potential, the emitter junction conducts to fire the SCR 106. The actual time delay depends on the values of the resistor 109 and capacitor 108. Experience has shown that a time delay of 100 milliseconds is sufficient to accelerate the film to a speed at which the film will not break when full power from the SCR bridge circuit 27 is applied to the motors 11 and 13.

Only a momentary contact need be made of either start switch 94 or 96, since the relay 92, which is energized by these switches, causes one of its contacts 112 to be grounded to thereby provide an additional ground for the lower sides 99 of the relays 89, 92, and 93. Current through the common grounding line 97 is conducted through a remote, normally closed stop switch 113 and through a series-connected, normally closed stop switch 114 associated with the control package. It may be seen that the camera may be stopped by opening either of these series-connected stop switches 113 or 114, causing de-energization of the relays 89, 92, and 93. When the relay 92 is de-energized, the supply reel brake 29 is energized by grounding one side of its coil through a contact 116.

INTEGRAL CONTROL

To achieve very precise speed control, the preferred embodiment of this invention provides an integral control circuit to operate with the operational amplifier 24. With integral and proportional control, the required gain or amplification by the operational amplifier may be kept relatively low, while maintaining accurate speed control. Integral control is accomplished electrically by accumulating the error or difference between the tachometer circuit voltage and the set point voltage as a charge on a capacitor in a feed-back loop of the operational amplifier circuit.

Referring now to FIG. 2, a feed-back line 120 may be seen leading from the output terminal 6 of the operational amplifier 24 to the terminal 1 of the mounting card associated with the comparison circuit 23. The feed-back loop continues from the output of the operational amplifier 24 and line 120 through a resistor 122, the capacitor 121 and another resistor 123 to the mixing point 50 or the input of the operational amplifier 24. The charge stored on the capacitor 121 is proportional to the time integral of the error voltage between the tachometer signal and the set point signal. Thus, since an error signal is accumulated with time, a relatively small error may be detected by the control circuit without the necessity of a relatively high gain or amplification from the operational amplifier, which could make the control circuit overly sensitive.

It is undesirable to permit the integrating capacitor 121 to integrate the error signal while the camera is accelerating to its set speed. The accumulation of an error signal during acceleration would result in an overshooting of actual camera speed beyond the desired set speed during start-up. Accordingly, this invention provides a novel method of introducing integral control only after the film has reached the point of transition from acceleration to constant set speed. This may be accomplished by shorting-out, or, in effect, removing the integral control capacitor 121 from the feed-back circuit of the operational amplifier network. Referring back to FIG. 1, it may be seen that the integral control 32 is responsive to a signal from the momentary brake energization circuit 28. To accomplish this, an integral control relay 126 (shown in FIG. 3) is energized at the same time the momentary brake energization circuit 28 energizes the supply reel brake 29 by grounding the line 127.

The lower side 128 of the integral control relay 126 is thereby grounded through a contact 129. The previously energized relay 92 connects a positive 24-volt source through a contact 131 of the relay 92 to drive the integral control relay 126. Until the integral control relay 126 is energized, it may be seen that the integral control capacitor 121 is shorted through conducting lines 132 and 133, shown connected to terminals 6 and 7, respectively, of the mounting card associated with the comparison circuit 23, as shown in FIG. 2, and the contacts 134 of the integral control relay 126 shown in FIG. 3. Thus, integral control is introduced into the operational amplifier network when the momentary brake energization circuit 28 senses the transition between acceleration and operation at constant speed.

The gain of the operational amplifier 24 is dependent on the relative values of the resistors 122, 123, and 140 through 145 of the comparison circuit. Proportional control with a gain or amplification of 100, without integral control, allows camera speed to be controlled to ±½% of full speed. A camera embodying this invention has been successfully controlled at speeds up to 10,000 frames per second. Thus, with a gain of 100, the camera may be controlled within a speed range of ±50 frames per second. It has been found that the addition of integral control provides, with a gain of 30, equal if not better control accuracy. Of course, a camera control constructed according to this invention need not employ integral control for it to achieve its purpose of improved camera speed control. The circuit may be modified accordingly by simply replacing the integrating capacitor 121 by a conductor and eliminating the integral control relay 126.

Likewise, precise camera speed control may be achieved without the use of two driving motors. The provision of a drive sprocket motor 13 and a take-up reel motor 11 is desirable, since such an arrangement reduces film tension. According to this invention, a workable arrangement may be had with only one motor if it is connected to drive the take-up reel 12. The potential high acceleration rate would be limited, since it would be necessary to drive the film sprocket 13 and prism assembly 16 by means of the film. The additional film tension required to drive the sprocket and prism assembly must be subtracted from that which would otherwise be available to accelerate the supply reel and film.

As mentioned above, a Variac 86 is provided to regulate the voltage supplied to the SCR motor control bridge circuit 27. It has been found desirable to limit the voltage supplied by the Variac 86 in situations where the desired optimum film speed is somewhat less than the potential speed capacity of the camera. When running at relatively low speeds, the drive motors 11 and 13 consume a proportionately small amount of power. This is reflected in the firing angle or the amount of time during which the SCRs 57 of the motor control circuit 27 conduct during a half-cycle. When the desired or film set speed is relatively low and the voltage applied to the SCR bridge circuit 27 is relatively high, the phase control firing circuit 26 operates the SCRs 57 only for a small fraction of each voltage half-cycle. Under these conditions, it is possible for the drive motors 11 and 13 to reflect pulsations of power by driving the film with an undesirable intermittent motion.

For these reasons, the Variac 86 is provided to reduce the voltage level supplied to the SCR bridge circuit 27. With a reduced voltage applied to the bridge circuit 27, the phase control firing circuit 26 will automatically compensate to supply the required power by changing the firing angle to increase the amount of time the SCRs 57 are in conduction. Since power is applied for a longer portion of each half-cycle, intermittent motor driving action will be minimized. Of course, means other than a Variac 86, such as a single 35 v. transformer which can be connected with the 115 v. line to provide voltages of 150 volts and 35 volts (and also 115 v. and 70 v.), may be provided to supply advantageous voltage ranges to the SCR bridge control circuit 27.

It is possible, according to this invention, to achieve accurate speed control of the film 17 without the momentary brake energization circuit 28. While maximum acceleration would not be achieved, the circuit would be made somewhat simpler. It has been found that the supply reel 31 will not overrun the drive sprocket 14 during the transition from acceleration to constant speed if the input voltage from the Variac 86 to the SCR control circuit 27 is limited to between 2% and 10% more than that minimum voltage required to operate the driving motors 11 and 13 at the desired set speed. Of course, this necessarily limits motor torque during acceleration. The extra voltage percentage would be available to maintain the desired set speed if line source voltage varied or inertial loads developed in accelerating the supply reel 31 at the end of a film roll.

Where the momentary brake energization circuit 28 is not provided, there would be no means to initiate action of the integral control circuit 32. In such a case, the integral control relay 126 and related circuitry may be eliminated to provide integral and proportional control during acceleration and operation at constant speed. Alternatively, integral control may be eliminated altogether in the manner described above.

What is claimed is:

1. A high speed camera having a supply reel and a take-up reel, motor means operable to cause movement of film wound on said reels relative to a fixed exposing station, variable power limiting means, speed control means governing the speed of said motor means by regulating the power from said power limiting means, said speed control means including a signal source for an adjustable speed command signal for predetermining and maintaining a desired rate of movement, and sensing means to sense the actual rate of movement of said film relative to said fixed exposing station; said speed control means being operable to accelerate said film to said predetermined rate of movement and to maintain such rate by compensating for variations in power requirements of said motor means.

2. A high speed camera according to claim 1 wherein said motor means drives said take-up reel.

3. A high speed camera according to claim 1 wherein said motor means comprises first drive means connected to drive said take-up reel and second drive means connected to drive said film at said fixed station.

4. A high speed camera having a supply reel and a take-up reel, motor means operable to cause movement of film wound on said reels relative to a fixed exposing station, brake means on said supply reel operable to resist the unwinding of said film from said supply reel, speed control means governing the speed of said motor means, said control means including sensing means to sense the actual rate of movement of said film relative to said fixed exposing station, set point means to predetermine the desired film rate of movement, and brake control means to momentarily energize said brake means during acceleration of said film when said actual rate of movement has reached a predetermined value with respect to said desired rate.

5. A high speed camera according to claim 4, wherein said predetermined value is below said desired rate.

6. A high speed camera according to claim 4, wherein said motor means drives said take-up reel.

7. A high speed camera according to claim 4, wherein said motor means comprises a first drive means connected to drive said take-up reel and a second drive means connected to drive said film at said fixed station.

8. A high speed camera having a supply reel and a take-up reel, motor means operable to move film relative to a fixed exposure station by winding it on said take-up reel and simultaneously unwinding it from said supply reel, brake means on said supply reel operable to resist the unwinding of said film from said supply reel, and electrical control means to accelerate said film to a desired speed and maintain said speed by regulating the electrical power supplied to said motor means, said control means including an electrical command signal associated with a desired film speed, sensing means to sense the actual speed of said film relative to said fixed station, said sensing means providing a signal proportional to the transport speed of said film, comparison means to compare said signals, the difference between said signals constituting an error signal, and brake energization means to momentarily energize said brake means when said error signal reaches a predetermined value.

9. A high speed camera according to claim 8, wherein said value corresponds to a condition wherein actual film speed is less than the desired speed.

10. A high speed camera according to claim 8, wherein said electrical control means includes an error integrator means to improve the accuracy of said control means.

11. A high speed camera according to claim 10, wherein said brake-energization means also energizes said integrator means.

12. A high speed camera having a supply reel and a take-up reel, motor means operable to move film relative to a fixed exposing station by winding it on said take-up reel and simultaneously unwinding it from said supply reel, electrical control means to accelerate said film to a desired speed range and maintain said speed range by regulating the electrical power to said motor means, said control means including a source for an electrical command signal associated with a desired speed and sensing means to sense the transport speed of said film relative to said fixed station, said sensing means providing a signal proportional to the actual transport speed of said film, comparison means to compare said signals, the difference between said signals constituting an error signal, integrator means adapted to produce the time integral of said error signal, and means to energize said integrator means when said error signal reaches a predetermined value.

13. A high speed camera according to claim 12, wherein said predetermined value corresponds to a condition wherein actual film speed is less than said desired speed.

14. A drive for an elongated record medium including a supply reel and take-up reel, motor means operable to transport said record medium wound on said reels relative to a fixed recording station, brake means on said supply reel operable to resist the unwinding of said record medium from said supply reel, speed control means governing the speed of said motor means and therefore the transport speed of said record medium, said speed control means including sensing means to sense the actual transport speed of said record medium relative to said fixed recording station and providing a speed signal proportional to actual film speed, set point means providing a set point signal to predetermine a desired transport speed, and brake control means to momentarily energize said brake means during acceleration of said record medium when said actual transport speed has reached a predetermined value near said desired speed.

15. A drive for an elongated record medium according to claim 14, wherein said speed control means includes signal comparison means to determine the difference between said signals, said difference constituting an error signal, said brake control means activating said integrator means operable to generate the time integral of said error signal, said brake control means activating said integrator means with the energization of said brake means.

16. A drive for an elongated record medium including a supply reel and take-up reel, motor means operable to transport said record medium wound on said reels relative to a fixed recording station, speed control means governing the speed of said motor means and therefore the transport speed of said record medium, said speed control means including sensing means to sense the actual transport speed of said record medium relative to said fixed recording station and providing a speed signal proportional to actual film speed, set point means providing a set point signal to predetermine a desired transport speed, comparison means to determine the difference between said signals, said difference constituting an error signal, integrator means operable to generate the time integral of said error signal and means to activate said integrator means when said error signal reaches a predetermined value.

17. A drive for an elongated record medium according to claim 16, wherein said predetermined value corresponds to a condition wherein said actual transport speed is less than said desired speed.

References Cited

UNITED STATES PATENTS

| | | | |
|---|---|---|---|
| 3,157,882 | 11/1964 | Barnett | 352—131 |
| 3,282,520 | 11/1966 | Hunt | 242—208 |
| 3,288,550 | 11/1966 | Saraber | 352—180 |
| 3,348,784 | 10/1967 | Gardiner et al. | 242—204 X |
| 3,475,090 | 10/1969 | Easterly | 352—174 |

LEONARD D. CHRISTIAN, Primary Examiner

U.S. Cl. X.R.

352—180

Docket No. 14-305

PO-1050
(5/69)

UNITED STATES PATENT OFFICE
CERTIFICATE OF CORRECTION

Patent No. 3,532,295        Dated October 6, 1970

Inventor(s) John E. Watson

It is certified that error appears in the above-identified patent and that said Letters Patent are hereby corrected as shown below:

Column 1, line 61, change "arrangeemnt" to -- arrangement --.

Column 1, line 69, change "compenstte" to -- compensate --.

Column 3, line 58, change "filmstrip" to -- film speed --.

Column 4, line 13, change "and" to -- through --.

Column 5, line 41, after "half cycle" insert --during--.

Claim 15, column 12, line 3, change "brake control means activating said" to -- speed control means also including --.

SIGNED AND SEALED
DEC 8 - 1970

(SEAL)
Attest:

Edward M. Fletcher, Jr.
Attesting Officer

WILLIAM E. SCHUYLER, JR.
Commissioner of Patents